July 30, 1968 — B. W. MAUPIN — 3,395,354
SWEEP CIRCUIT
Original Filed March 22, 1962 — 2 Sheets-Sheet 2

Bob W. Maupin
INVENTOR.
BY James A. Bargfrede
ATTORNEY

United States Patent Office

3,395,354
Patented July 30, 1968

3,395,354
SWEEP CIRCUIT
Bob W. Maupin, Dallas, Tex., assignor to General Electrodynamics Corporation, Dallas, Tex., a corporation of Texas
Continuation of application Ser. No. 181,735, Mar. 22, 1962. This application Aug. 5, 1965, Ser. No. 477,375
7 Claims. (Cl. 328—182)

ABSTRACT OF THE DISCLOSURE

A sweep circuit for systems utilizing two dimensional plotting of time or range versus angular direction. Direction information is provided to the sweep circuit by three-wire carrier signal from a synchro transmitter located in related equipment. The three-wire synchro signal is first resolved into its horizontal and vertical components by the use of Scott connected transformers. The horizontal and vertical outputs are applied to separate but identical phase sensitive demodulators. A sweep period multi-vibrator is coupled to both the horizontal and vertical component circuits. The horizontal and vertical component circuits provide a voltage waveform which will deflect a cathode ray tube or other electron discharge device in a rotating vector manner.

Cross reference to related application

This application is a continuation of my copending application Ser. No. 181,735 filed Mar. 22, 1962, now abandoned and entitled "Sweep Circuit."

Background of the invention

In known pulse echo apparatus such as radar the main components generally include a pulsed transmitter, a highly directive antenna system, a receiver, and display apparatus. Such display apparatus includes a scanning system and many types of scanning systems for the electron beam imaging tubes have been used. Such systems generally may utilize a servo network, resolvers, or rotating yokes. Known systems of scanning electron beam imaging tubes also have been dependent upon a particular carrier frequency and the scan has been limited by the antenna rotational speed. In brief, known systems of scanning in conventional radar and sonar equipment have not been of optimum design. The principal motivation for the present invention has been the improvement of known scanning systems.

Summary of the invention

Thus it is the object of the present invention to provide improved scanning apparatus which is particularly adaptable for use in a pulse echo system such as radar.

Another object of the present invention is to provide a scanning system which is adaptable for use in a radar system, such scanning system being independent of synchro carrier frequency and being operable from conventional sixty cycles-per-second alternating current or any other alternating current source of reasonable frequency.

Still another object of the present invention is to provide an improved scanning system for use with a pulse echo system where in directional information of such scanning system may be picked off of position synchros which are generally available in related apparatus.

Another object of the present invention is to provide a scanning circuit which is a position tracker and therefore adaptable for use in rotating or sector scanning.

Yet another object of the present invention is to provide a scanning circuit for use in a pulse echo system wherein the scanning system is operable over a wide range of antenna rotational speeds.

A further object of the present invention is to provide a scanning circuit which is independent of trigger pulse repetition rate as long as the sweep time is shorter than the trigger repetition time.

A still further object of the present invention is to provide improved scanning apparatus wherein the sweep time of such scanning apparatus is independent of the trigger rate and may be varied easily over a wide range.

Still another object of the present invention is to provide improved scanning apparatus wherein mechanical rotation of deflection yokes is eliminated thereby allowing the yoke or deflection plates of the electron beam device to remain stationary.

Still another object of the present invention is to provide scanning apparatus adapted for use with a pulse echo system wherein such scanning apparatus requires appreciably less power than known scanning apparatus.

Description of the preferred embodiments

Briefly stated, the present invention provides a sweep circuit which may be utilized in existing radar and sonar systems as well as any other systems utilizing two dimensional plotting of time or range versus angular direction. Direction information is provided to the sweep circuit by three-wire carrier signal of sixty cycles-per-second or four hundred cycles-per-second or any reasonable frequency from a synchro transmitter located in related equipment. The three-wire synchro signal is first resolved into its $x$ and $y$ or horizontal and vertical components by the use of Scott connected transformers. The two outputs, horizontal and vertical, are applied to separate but identical phase sensitive demodulators. A sweep period multi-vibrator is coupled to both the horizontal and vertical components circuits. The horizontal and vertical components circuits provide a voltage waveform which will deflect a cathode ray tube or other similar electron discharge device in a rotating vector, Rho-theta, or Plan Position Indicator manner.

Figure 1:
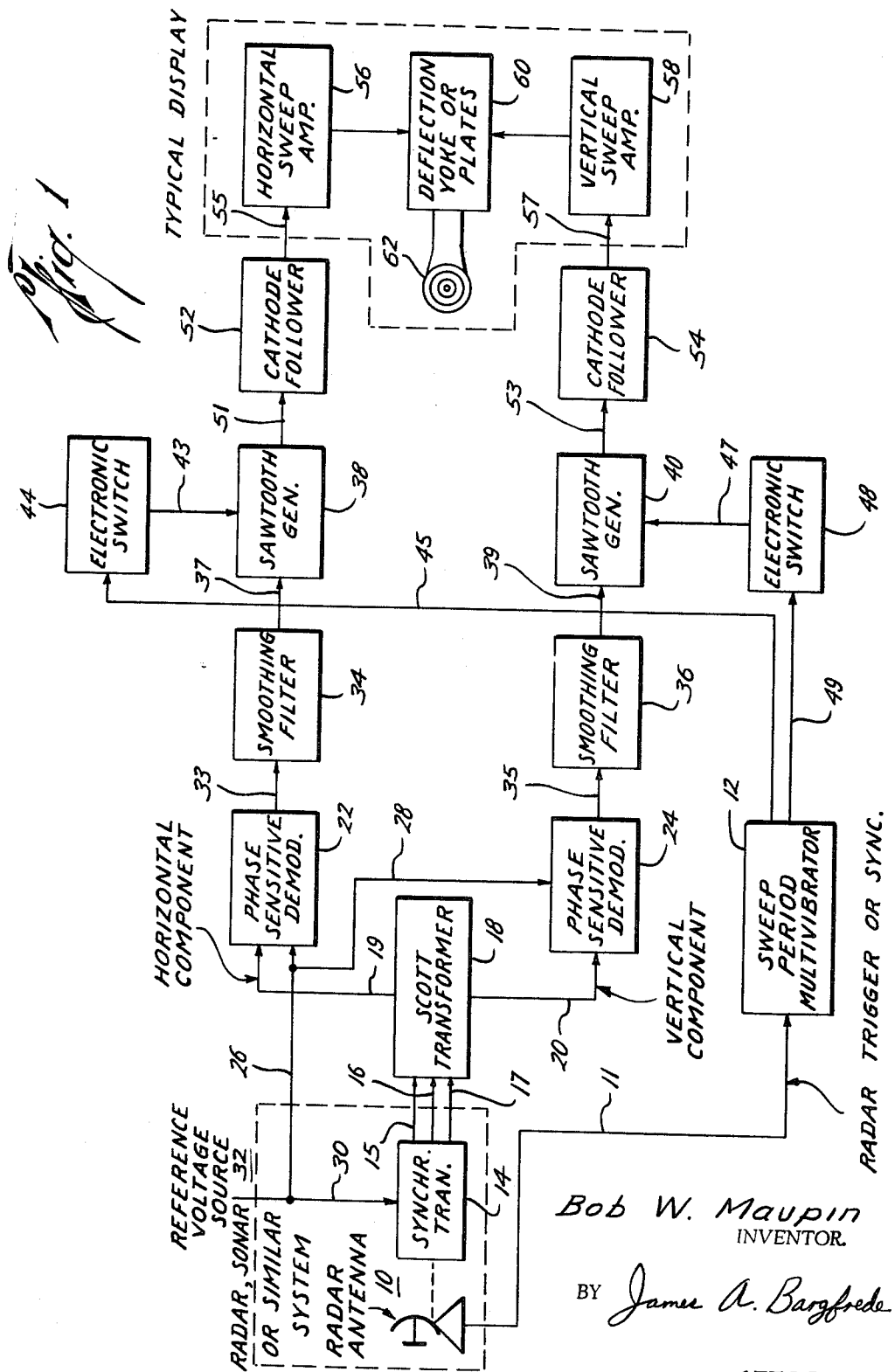
FIGURE 1 is a block diagram of the various component stages of the present invention.

Referring now to the drawings in detail, FIGURE 1 shows a radar antenna 10 coupled through lead 11 to a sweep period multivibrator 12. Couplable to the radar antenna 10 is a synchro transmitter 14. Coupled to the synchro transmitter 14 through leads 15, 16, and 17 is a Scott transformer circuit 18. Such Scott transformer circuit may be similar to the circuit shown on page 1983 of Mechanical Engineers' Handbook by Lionel S. Marks, 5th edition. The output of the Scott transformer circuit 18 is coupled through leads 19 and 20 to a horizontal component system and a vertical component system respectively. The horizontal component system and the vertical component system are identical in structure and function.

Each of the horizontal and vertical component circuits includes a phase sensitive demodulator designated as 22 and 24 for the horizontal and vertical components respectively. Each such demodulator is coupled through leads 26, 28 and 30 to the synchro transmitter 14 and to a reference voltage source 32, the demodulators and synchro transmitter thus being referenced to the same source. Each of the phase sensitive demodulators 22 and 24 is coupled through leads 33 and 35 to smoothing filters 34 and 36 respectively. Filter 34 is coupled through lead 37, to sawtooth generator 38, and filter 36 is coupled through lead 39 to sawtooth generator 40.

Sawtooth generator 38 is coupled through lead 43 to an electronic switch 44 which in turn is coupled through lead 45 to the sweep period multivibrator 12. Sawtooth generator 40 is coupled through lead 47 to electronic switch 48 which is coupled through lead 49 to sweep period multivibrator 12.

Coupled to sawtooth generator 38 through lead 51 is a cathode follower 52 which is coupled through lead 55 to a horizontal sweep amplifier 56. Cathode follower 54 is coupled through lead 53 to sawtooth generator 40 and through lead 57 to vertical sweep amplifier 58. The outputs of sweep amplifiers 56 and 58 are coupled to the deflection yoke or plates 60 of an electron discharge device such as a cathode ray tube represented as 62 on FIGURE 1.

Figure 2:
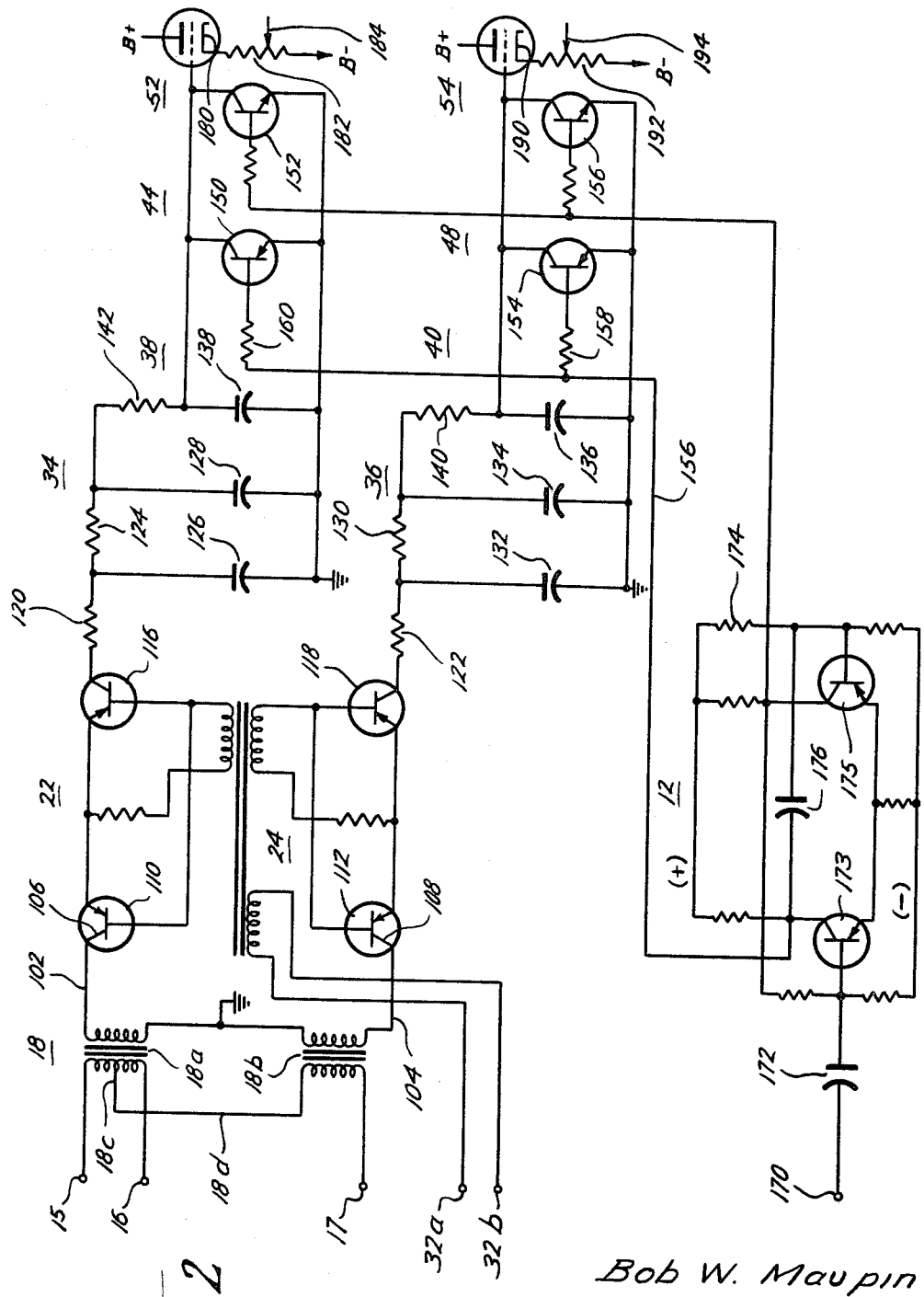
FIGURE 2 is a circuit schematic of a portion of the block diagram shown in FIGURE 1.

FIGURE 2 is a circuit schematic showing portions of the block diagram circuit of FIGURE 1. A three-wire input synchro signal from leads 15, 16, and 17 is applied to transformer 18a and transformer 18b which are Scott coupled so that primary tap 18c of transformer 18a is coupled through the lead 18d to the primary winding of transformer 18b. Outputs 102 and 104 from the Scott connected transformers are coupled to the collector electrodes 106 and 108 of transistors 110 and 112 respectively of phase sensitive demodulators 22 and 24. The base of transistor 116 and the base of transistor 110 are D.-C. coupled as are the bases of transistors 112 and 118 of phase sensitive demodulator 24. Demodulators 22 and 24 are driven or referenced by a reference voltage source 32 having inputs 32a and 32b. This reference voltage source also is used to supply voltage to the synchro transmitter. In this manner the two associate pairs of transistors are caused to be turned on during one half of the reference voltage cycle and to be off during the other half of the cycle.

The output of each of demodulators 22 and 24 is a direct current signal, the amplitude and polarity of which is proportional to the amplitude and phase of the signal from the Scott transformers 18a and 18b and such signal represents the angular direction vector of the synchro transmitter shaft. Such direct current signal appears at the collectors of transistors 116 and 118 and contains carrier frequency ripple which is attenuated by smoothing filters 34 and 36. Filter 34 includes resistors 120 and 124 and capacitors 126 and 128. Similarly filter 36 includes resistors 122 and 130 and capacitors 132 and 134.

The outputs of filters 34 and 36 are direct current signals which represent the horizontal and vertical components respectively of the resolved synchro shaft position. Such direct current signals are applied to charging networks 38 and 40 which include capacitors 136 and 138 and resistors 140 and 142. Capacitor 138 and resistor 142 are series coupled as are capacitor 136 and resistor 140. Capacitors 136 and 138 are discharged at the end of each sweep by electronic switch circuits 48 and 44 respectively. Circuit 44 includes a PNP transistor 150 and an NPN transistor 152 coupled in parallel. Both of these transistors are off during the sweep period and on during the retrace period. The time constant of charging network 38 should be made long compared to the duration of the sweep time so that a sawtooth wave of good linearity is generated. Switch circuit 48 of the vertical component circuit includes PNP transistor 154 and NPN transistor 156 coupled in parallel.

The charging time and resting or retrace time is controlled by the sweep period multivibrator 12 which is coupled through lead 156 to resistor 158 which is coupled to the base of transistor 154 and to resistor 160 which is coupled to the base of transistor 150. The multivibrator 12 normally holds the electronic switch circuit 44 in the "on" position thereby maintaining the sweep signal at the resting potential. Multivibrator circuit 12 includes transistors 173 and 175. When multivibrator 12 is triggered into the alternate condition by an input trigger or sync pulse from input 170 the electronic switch circuit 44 is turned off and the sweep period begins as capacitor 138 begins charging toward the direct current modulating voltage through resistor 142. The sweep rate is controlled by the time constant of resistor 142 and capacitor 138 and the sweep time is controlled by the time constant of resistor 174 and capacitor 176. These time constants are variable and can be selected through a switching arrangement in multiple range applications. Switch circuit 48 operates in a similar manner to switch circuit 44.

The output of the electronic switch circuit 44 is coupled to a cathode follower 52 and the output of electronic switch circuit 48 is coupled to cathode follower 54. Each of such cathode followers are included as an output stage because of the high input impedance and low output impedance. The cathode 180 of the cathode follower 52 is returned to a negative potential through a potentiometer 182 which acts as a D.C. level control. Potentiometer 182 may be adjusted to cause the sawtooth sweep waveform to swing positive and negative as the direction vector rotates while maintaining the resting or retrace period clamped to ground. The tap 184 of potentiometer 182 is coupled to a sweep amplifier (shown in FIGURE 1) with the resulting voltage waveform driving deflection plates or yoke of a cathode ray tube or similar device causing the same to deflect in a rotating vector, Rho-theta, or Plan Position Indicator manner. Cathode 190, potentiometer 192, and tap 194 of cathode follower 54 react as explained for circuit 52.

The sweep circuit of the present invention is especially adaptable for use in radar systems and sonar systems but its use may be on any electronic equipment having two dimensional plotting of time or range versus angular direction. Thus the sweep circuit of the present invention may be used on radar Plan Position Indicators, radar range height indicators, sonar PPI, sonar range height indicators, and medical sonar inverted plan position indicators.

The sweep circuit of the present invention, when compared with known sweep circuits, is substantially simpler, economical in cost and power consumption, and is substantially independent of many of the variables which affect the operation and utility of known systems.

While a preferred embodiment of the invention has been shown and described, the invention is defined by the following claims. Although such claims have been presented in indented, paragraphed form to facilitate reading and understanding, such form is not intended to limit the structural or functional interpretation thereof.

What is claimed is:

1. A sweep circuit adapted for use with a pulse-echo system, said sweep circuit including
    converter means having an input coupled to a three-phase signal source, said source being adapted to supply an input signal having horizontal and vertical components, said converter means providing separate first and second output signals representative of the horizontal and vertical components of the source signal,
    shaping means coupled to said converter means for altering the output signals therefrom, and
    sweep period means coupled to said shaping means for providing horizontal and vertical sweep signals which are adapted for use with an electron beam discharge device.

2. A sweep circuit defined by claim 1 wherein said converter means includes inductance means having first and second windings with one of said windings having a tap thereon.

3. A sweep circuit defined by claim 1 wherein said sweep period means includes multivibrator means and switching means.

4. A network adaptable for use with a signal source providing horizontal and vertical signal components, said network including demodulator means coupled to the signal source and to a reference potential source, filter means coupled to said demodulator means, sawtooth generator means coupled to said filter means, switching means coupled to said sawtooth generator means for controlling the same in response to a preselected time period, and cathode follower means coupled to said sawtooth generator means whereby a signal potential is provided for altering the electron beam of an electron discharge device.

5. The network of claim 4 wherein said demodulator means includes first and second transistors each having a base, an emitter, and a collector electrode, said first transistor collector being coupled to the input signal source, said second transistor collector being coupled to the filter means, said emitters of said first and second transistors being direct current coupled and series coupled through impedance means to said bases of said first and second transistors.

6. A circuit adapted for use in a pulse-echo system comprising
    a movable antenna,
    means connected to said antenna to produce a three-phase signal indicative of the directional positioning of the antenna, and
    a transformer including first and second portions each having a primary and a secondary winding, said primary windings being coupled to said means, said first portion primary winding having a tap thereon series coupled to said second portion primary winding, and said first and second portion secondary windings being series coupled to provide separate first and second signals which are directly related to the directional positioning of the antenna.

7. A sweep circuit adapted for use with a pulse-echo system, said sweep circuit including
    converter means including impedance means having an input coupled to a source of a three-phase signal having horizontal and vertical components, said converter means providing an output having separate first and second signals representative of the horizontal and vertical components of the source signal,
    shaping means coupled to the output of said converter means for altering the signals therefrom, and
    sweep period means coupled to said shaping means for providing horizontal and vertical sweep signals which are adapted for use with an electron beam discharge device.

References Cited

UNITED STATES PATENTS

| 2,541,093 | 2/1951 | Page | 321—57 XR |
| 2,720,645 | 18/1955 | Sherwin | 343—10 |
| 2,748,338 | 5/1956 | Williamson | 321—57 |

ARTHUR GAUSS, *Primary Examiner.*

J. ZAZWORSKY, *Assistant Examiner.*